March 3, 1959  D. M. GURNEY ET AL  2,875,637
GEAR SHIFT ASSEMBLY
Filed May 11, 1955  2 Sheets-Sheet 1
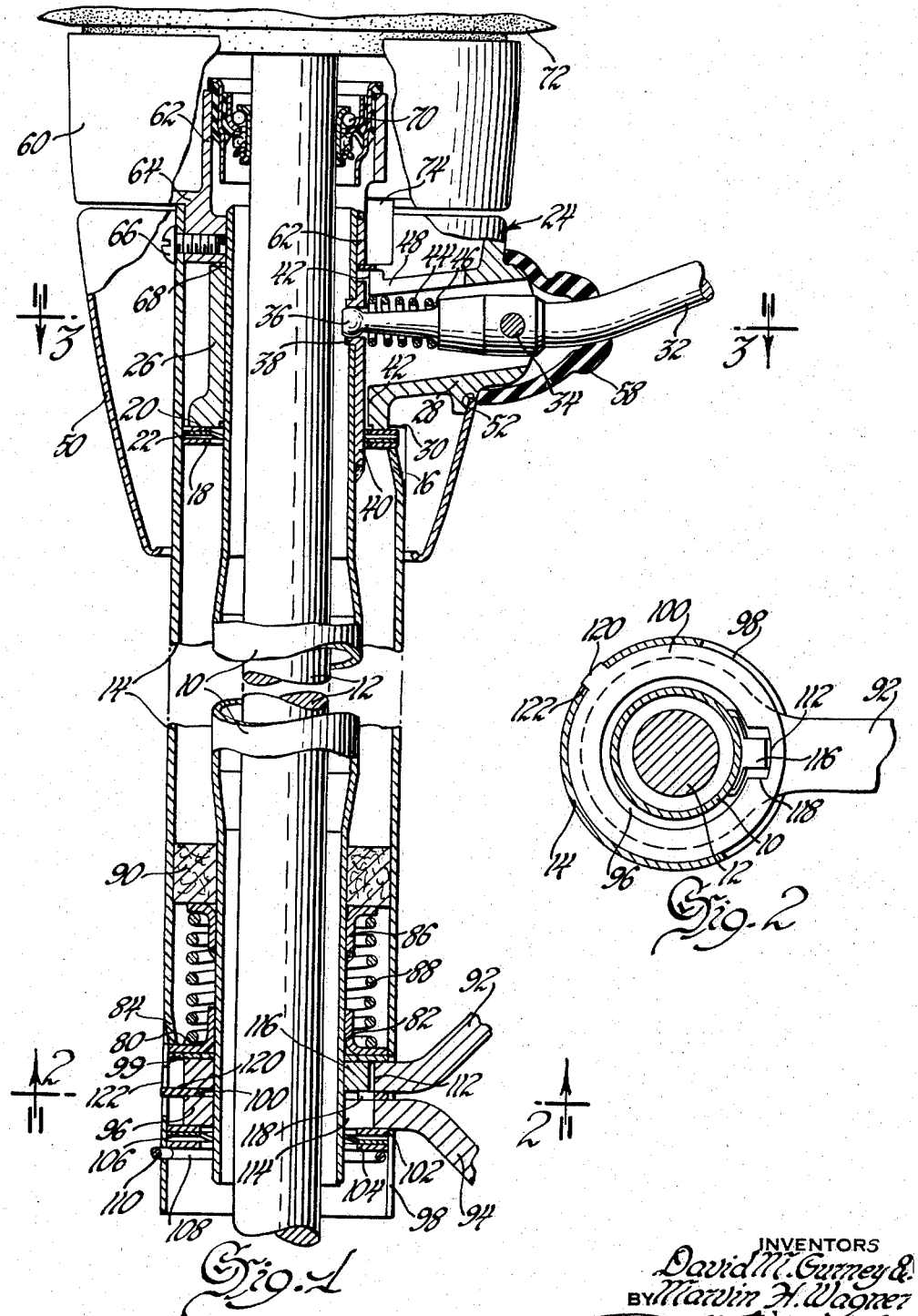
INVENTORS
David M. Gurney &
BY Marvin H. Wagner
Paul Fitzpatrick
ATTORNEY March 3, 1959 D. M. GURNEY ET AL 2,875,637
GEAR SHIFT ASSEMBLY
Filed May 11, 1955 2 Sheets-Sheet 2
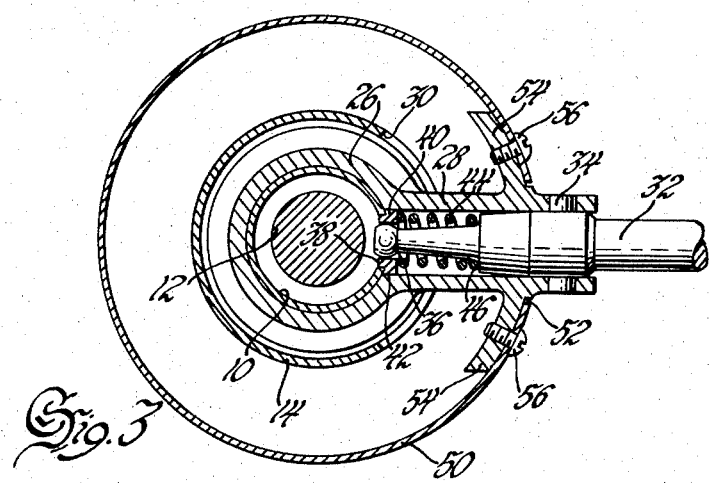
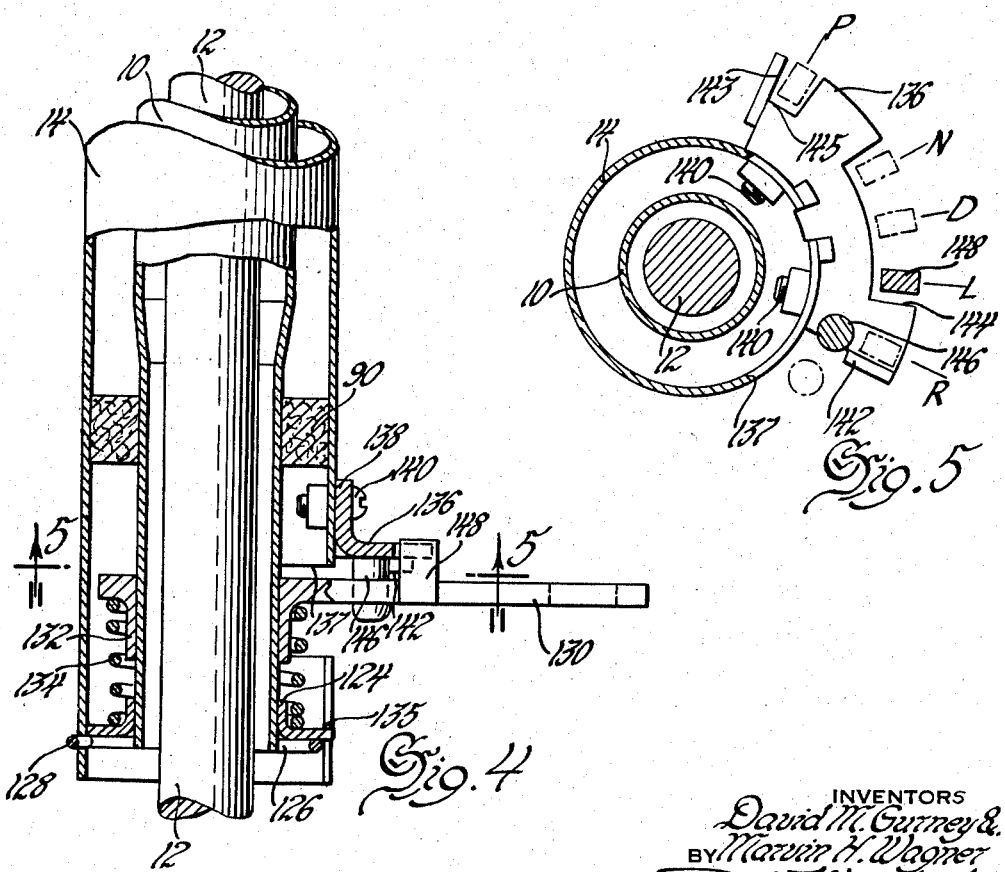
INVENTORS
David M. Gurney &
BY Marvin H. Wagner
Paul Fitzpatrick
ATTORNEY

United States Patent Office 2,875,637
Patented Mar. 3, 1959

2,875,637
GEAR SHIFT ASSEMBLY

David M. Gurney, Fosters, and Marvin H. Wagner, Saginaw, Mich., assignors to General Motors Corporation, Detroit, Mich., a corporation of Delaware Application May 11, 1955, Serial No. 507,677

19 Claims. (Cl. 74—484)

This invention relates to automotive transmission controls and more particularly to improved arrangements for transfer of control settings from the manually operated lever on the steering column to a change speed transmission of either the selective sliding gear or automatic type.

An object of this invention is to provide an improved mechanism for transfer of control settings selected by the operator of the vehicle to a change speed transmission. Another object of this invention is to provide an improved transmission control easily adaptable for use with either a manually shiftable or automatic type transmission.

These and other objects of this invention will be readily apparent from the following specification and drawings, in which:

Figure 1 is an elevational view, principally in section, on a plane through the axis of the steering column showing a transmission control mechanism according to this invention for use with a manually shiftable transmission;

Figure 2 is a plan view on the plane indicated by line 2—2 of Figure 1;

Figure 3 is a plan view on the plane indicated by line 3—3 of Figure 1;

Figure 4 is an elevational view, principally in section, on a plane containing the axis of the steering column showing the lower portion of a transmission control according to this invention for use with an automatic type transmission; and Figure 5 is a plan view on the plane indicated by line 5—5 of Figure 4.

The upper portion of the transmission control of this invention is the same for use with either a manually shiftable transmission or an automatic type transmission and is shown in Figures 1 and 3. The steering column assembly includes a control tube 10 concentrically mounted between the steering shaft 12 and the mast jacket or steering column 14. The steering column has a number of inwardly extending spaced tongues 16 supporting a washer assembly including thrust washers 18 and 20, and a wavy spring washer 22 interposed between the flat washers. The shift arm housing 24 includes a collar portion 26 encircling the control tube 10 and a tubular portion 28 opening into the bore of the collar portion, with the lower edge of the collar portion seating on washer 20 to support the shift arm housing on the steering column assembly. The tubular portion 28 extends radially outwardly through an upwardly opening slot 30 in the steering column 14, with the slot having sufficient width to allow rotary movement of the shift arm housing relative to the steering column as will be described.

The tubular portion 28 of the shift arm housing receives the inner end of the manually operable shift lever 32 which is pivoted within the housing on pin 34. The inner end of the lever terminates in a ball portion 36 fitting with a circular flange 38 of key 40. Flange 38 fits within a similar shaped opening in the control tube 10, and key 40 is spot welded or otherwise secured to the outer surface of the control tube. Key 40 slides in a keyway 42 formed in collar portion 26, and an antirattle spring 44, encircling the shift lever, extends between key 40 and shoulder 46 of the lever. The tubular portion 28 is slotted at 48 to provide access to the inner end of the shift arm for assembly or lubrication.

The shift lever 32 is mounted on pin 34 for pivotal movement about the pin in a plane containing the axis of the steering column assembly. Upward movement of the outer end of the shift lever by the operator causes key 40 to a slide downwardly in keyway 42 and move the control tube 10 downwardly within the steering column assembly. Likewise, downward movement of the outer end of the shift lever by the operator causes upward sliding movement of key 40 in keyway 42 and upward movement of the control tube within the steering column assembly. The shift arm housing 24 may also be rotated relative to the steering column assembly, with tubular portion 28 moving in slot 30 of steering column 14, by moving the shift lever either clockwise or counterclockwise in a plane normal to the axis of the steering column assembly. This movement of the shift lever and shift arm housing will correspondingly rotate the control tube 10 in the same direction about the axis of the steering column assembly. Thus, the control tube will either by shifted upwardly or ownwardly, or rotated with respect to the steering column assembly depending on the movement of the shift lever by the operator.

A bowl 50 having an upwardly opening slot 52 receiving tubular portion 28 fits around the upper portion of the steering column assembly. The bowl is secured to wings or tabs 54 of the tubular portion by screws 56 to rotate with the shift arm housing. A rubber dust shield 58 extends between the shift arm lever and the outer end of tubular portion 28 to prevent dust and dirt from entering tubular portion 28.

The direction signal switch housing 60 includes an inner sleeve 62 joined by an annular web 64 to the outer wall of the housing. The lower portion of the sleeve fits within the upper end of the steering column assembly between the steering column 14 and the control tube 10 and is secured to the steering column by bolt 66, with thrust washer 68 being interposed between the sleeve and the upper edge of collar portion 26 of the shift arm housing. Sleeve 62 encircles the control tube to provide a bearing surface for locating the upper end of the tube and also mounts bearing 70 locating the upper end of the steering shaft 12. The hub 72 of the steering wheel is secured to the upper end of the steering shaft in a suitable manner. Sleeve 62 and web 64 of the direction signal switch housing are slotted at 74 to allow passage of wires from the housing to various switches, etc., located within the steering column assembly below the shift lever mechanism.

Thus, the upper portion of the steering column assembly includes as few parts as possible, and is easily assembled and disassembled for repairs or otherwise. By removing screws 56, bowl 50 can be moved downwardly along the steering column assembly to gain access for lubrication of the assembly. Once the steering wheel has been disassembled from the steering shaft, removal of bolt 66 allows the entire upper portion to be disassembled for repairs.

As previously stated, the upper portion of this transmission control can be used with either a manually shiftable or an automatic type transmission. The lower portion of the control for a manually shiftable transmission will now be described, with reference to Figures 1 and 2 of the drawings. The lower end of the control tube 10 is located by a bearing plate 80 having a sleeve portion 82 encircling the control tube. The outer edge of the bearing plate engages the inner wall of steering column 14, and a number of inwardly extending tongues 84 struck out of the column limit upward movement of the plate. A plate 86 similar in size and shape to plate 80 is spot welded or otherwise secured to the control tube, and a coil spring 88 extends between the plates to yieldingly hold the control tube in its upward or second and high shift positions. A fiber gasket 90 fitting between the control tube and steering column prevents dirt and noise from passing up the steering column assembly between these parts.

The control tube is alternately and selectively clutchable to either of two shift arms, an upper arm 92 and a lower arm 94, with each arm having an annular inner end 96 encircling and engaging the control tube but spaced from the steering column 14. The steering column is provided with a downwardly opening slot 98 of sufficient width to allow the necessary rotary movement of the arms about the axis of the steering column assembly, as will be described. A thrust washer 99 fits between the inner end 96 of arm 92 and bearing plate 80, and a washer 100 is interposed between the inner ends of both arms. The thrust washers and arms are supported by a washer assembly including thrust washers 102 and 104, wavy washer 106 interposed between these washers, and retaining ring 108 having a number of spaced undulations 110 fitting within slots in the steering column when the ring is snapped in place. The wavy washer provides a resilient action which ensures the proper assembly of the arms and washers within the manufacturing tolerances and wear limits. Thrust washers 99, 102, and 104 and wavy washer 106 engage the inner surface of the steering column, with all of the washers except washer 99 being spaced from the control tube, since bearing plate 80 locates the lower end of the tube.

As already stated, each of the shift arms 92 and 94 is alternately and selectively clutchable to the control tube 10. The arms include T-shaped keyways 112 and 114, Figure 2, and a similar shaped but smaller key 116 secured to the control tube alternately and selectively fits within either keyway to alternately clutch the control tube to either arm. Washer 100 between the levers has a keyway 118 which is slightly larger than keyways 112 and 114 so that shift lever 32 need not be exactly centered for selecting movement. However, keyway 118 is small enough to require that the transmission be shifted to neutral before a cross shift, clutching the other arm to the control tube, can be made. In order to ensure alternate clutching of the arms to the control tube, washer 100 has a tab 120 which fits within a slot 122 in the steering column to prevent rotational movement but allow up and down movement of the washer. Thus, key 116 must fit entirely within either keyway 112 or keyway 114 before either arm can be rotated, for if the key fits within both keyways 112 and 114 and keyway 118, or fits within either keyway 112 or 114 and keyway 118, the transmission cannot be shifted.

Referring now to Figures 4 and 5, the lower end of the transmission control for an automatic type transmission will be described. The lower end of the control tube is located by a bearing plate 124 encircling and engaging the control tube, with the outer edge of the plate engaging the steering column 14. The plate is supported by a retaining ring 126 having a number of spaced undulations 128 fitting within slots in the steering column. The shift arm 130 includes an inner terminal sleeve portion 132 which is welded or otherwise secured to the control tube 10. A coil spring 134 extending between the shift arm and bearing plate 124 resiliently holds the control tube and lever 130 in their upper or normal shift position. The steering column includes a downwardly opening T-shaped slot 135 for the shift arm 130, with the circumferential part 137 of the slot being of sufficient extent to allow the necessary rotary movement of the shift arm as will be described.

A plate 136 has a pair of spaced tabs 138 which are secured to the steering column by bolts 140 to mount the plate on the column. The plate is of sector shape and includes downwardly extending terminal tabs 142 and 143, slot 144, and slot 145. The shift arm 130 mounts an upwardly extending nylon stop 146 which engages the lower surface of the plate to limit the upward movement of the arm and control tube under the action of spring 134, except in the Reverse position of the arm as will be described. A tab or lug 148 extends upwardly from one side of the shift arm and fits within slot 145 in the Park position of the arm; slot 144 in the Neutral, Drive, and Low positions of the arm; and engages the lower side of the plate adjacent tab 142 in the Reverse position of the arm. The various positions of lug 148 are indicated in Figure 5 by the letters P, N, D, L, and R.

Stop 146 is shorter than lug 148 so that the lug will extend slightly beyond the upper surface of the stop plate as can be seen in Figure 4. Thus, the shift arm can be moved between Low, Drive, and Neutral positions by rotary movement of the control tube and shift arm 32. However, if it is desired to move the shift arm to either Park or Reverse positions, the control tube is moved downwardly by upward movement of the outer end of the shift lever 32, Figure 1, by the operator and then the control tube and arm are rotated by the shift lever until lug 148 enters slot 145 or engages tab 142. This prevents accidental movement of the shift lever 130 to either of these positions. As previously stated, stop 146 provides an upper limit stop for shift arm 130 except in the Reverse position of the arm. Stop 146 is located substantially along the center line of the arm while lug 148 is located on one side of the arm. Thus, when lug 148 is in Reverse position, stop 146 is beyond the plate, at 146', and lug 148 acts as an upper limit stop. Since lug 148 is longer than stop 146, movement of the shift arm between Reverse and Neutral positions does not result in any engagement between stop 146 and the edge of the plate. Tabs 142 and 143 acts as limit stops in the Reverse and Park positions of the shift arm and lug 148.

Thus, this invention provides an improved mechanism for transmission of control settings to either a manually shiftable or an automatic type transmission.

While specific embodiments of this invention has been shown and described, various changes and modifications may be made within the scope and spirit of the invention.

We claim:

1. A shift control mechanism comprising, in combination, a support column, a control tube supported by said column for rotary and reciprocal movement relative to a fixed axis, a housing pivotally supporting a shift lever, means mounting said housing interiorly of said column for rotary movement relative to said fixed axis, said means including a number of inwardly extending spaced abutments on said support column and resilient means interposed between said abutments and said housing, and means positioned by movement of said control tube for setting the shift position of a change speed transmission.

2. A shift control mechanism comprising, in combination, a support column, a control tube supported by said column for rotary and reciprocal movement relative to a fixed axis, a housing pivotally supporting a shift lever, means mounting said housing interiorly of said column for rotary movement relative to said fixed axis, said means including a number of integral inwardly extending spaced abutments on said support column and a thrust and spring washer assembly supported on said abutments and engaging said housing, and means positioned by movement of said control tube for setting the shift position of a change speed transmission.

3. A shift control mechanism comprising, in combination, a support column, a control tube supported by said column for rotary and reciprocal movement relative to a fixed axis, a housing including a collar portion encircling said control tube and a laterally extending tubular portion pivotally supporting a shift lever, means mounting said housing interiorly of said column for rotary movement relative to said fixed axis, said means including a number of integral inwardly extending spaced abutments on said support column and a thrust and spring washer assembly seating on said abutments and engaging said collar portion to resiliently support said housing, and means positioned by movement of said control tube for setting the shift position of a change speed transmission.

4. A shift control mechanism comprising, in combination, a support column, a control tube supported by said column for rotary and reciprocal movement relative to a fixed axis, a housing, means mounting said housing interiorly of said column for rotary movement relative to said fixed axis, said means including a number of inwardly extending spaced abutments on said column and resilient means interposed between said abutments and said housing, hand lever means pivotally supported by said housing and terminating in a ball end fitting within said control tube, socket means mounted on said control tube for receiving said ball end and including axially extending key means, keyway means on said housing slidably receiving said key means, movement of said hand lever means in a plane containing said fixed axis causing reciprocal movement of said control tube and sliding movement of said key means in said keyway means, and means positioned by movement of said control tube for setting the shift position of a change speed transmission.

5. A shift control mechanism comprising, in combination, a support column, a control tube supported by said column for rotary and reciprocal movement relative to a fixed axis, a housing, means mounting said housing interiorly of said column for rotary movement relative to said fixed axis, said means including a number of integral inwardly extending spaced tongues on said column and a thrust and spring washer assembly seated on said tongues and supporting said housing, hand lever means pivotally supported by said housing and terminating in a ball end fitting within said control tube, socket means mounted on said control tube for receiving said ball end and including axially extending key means, keyway means on said housing slidably receiving said key means, movement of said hand lever means in a plane containing said fixed axis causing reciprocal movement of said control tube and sliding movement of said key means in said keyway means, movement of said hand lever means in a plane normal to said fixed axis causing rotary movement of said control tube, said key and keyway means cooperating to cause said housing to rotate with said control tube; and means positioned by movement of said control tube for setting the shift position of a change speed transmission.

6. A shift control mechanism comprising, in combination, a support column, a control tube supported by said column for rotary and reciprocal movement relative to a fixed axis, a pair of shift arms alternately and selectively clutchable to said control tube for rotary movement therewith, resilient means supported by said shift arms and engageable with said control tube for urging said control tube in one axial direction, a retaining member detachably supported by said column, and resilient means interposed between said retaining member and said shift arms and urging said shift arms in said one axial direction.

7. A shift control mechanism comprising, in combination, a support column, a control tube supported by said column for rotary and reciprocal movement relative to a fixed axis, a pair of shift arms alternately and selectively clutchable to said control tube for rotary movement therewith, an abutment member secured to said control tube, resilient means supported by said shift arms and engaging said abutment member for urging said control tube in one axial direction, a retaining member detachably supported by said column, resilent means interposed between said retaining member and said shift arms and urging said shift arms in said one axial direction, and means limiting the movement of said shift arms in said one axial direction.

8. A shift control mechanism comprising, in combination, a support column, a control tube supported by said column for rotary and reciprocal movement relative to a fixed axis, a pair of shift arms alternately and selectively clutchable to said control tube for rotary movement therewith, a first collar fixed to said control tube, a number of spaced abutments on said support column, a second collar supported by said shift arms, spring means mounted on said second collar and engaging said first collar to urge said control tube in one axial direction, a retaining member detachably supported by said collar, and resilient means interposed between said retaining member and said shift arms and urging said shift arms in said one axial direction.

9. A shift control mechanism comprising, in combination, a support column, a control tube supported by said column for rotary and reciprocal movement relative to a fixed axis, a pair of shift arms alternately and selectively clutchable to said control tube for rotary movement therewith, a first collar fixed to said control tube, a number of integral inwardly extending tongues on said support column, a second collar supported by said shift arms and engaging said tongues, spring means mounted on second collar and engaging said first collar for urging said control tube in one axial direction, a retaining member detachably supported by said column, and a thrust and spring washer assembly interposed between said retaining member and said shift arms and urging said shift arms in said one axial direction, said tongues limiting the movement of said shift arms in said one axial direction.

10. A shift control mechanism comprising, in combination, a support column, a control tube supported by said column for rotary and reciprocal movement relative to a fixed axis, a shift arm supported by said tube for rotary and reciprocal movement therewith and having projecting lug means, and means supported by said column having slots spaced circumferentially relative to said fixed axis for receiving said lug means, said lug means being movable between said slots upon reciprocal and rotary movement of said control tube and shift arm relative to said fixed axis.

11. A shift control mechanism comprising, in combination, a support column, a control tube supported by said column for rotary and reciprocal movement relative to a fixed axis, a shift arm supported by said tube for rotary and reciprocal movement therewith and having projecting lug means, means supported by said column having slots spaced circumferentially relative to said fixed axis for receiving said lug means, said lug means being movable between said slots upon reciprocal and rotary movement of said control tube and shift arm relative to said fixed axis, and resilient means urging said lug means into cooperating relationship with said slots and resisting reciprocal movement of said control tube as said lug means is moved between said slots.

12. A shift control mechanism comprising in combination, a support column, a control tube supported by said column for rotary and reciprocal movement relative to a fixed axis, a shift arm supported by said tube for rotary and reciprocal movement therewith and having projecting lug means, plate means supported by said column having slots spaced circumferentially relative to said fixed axis for receiving said lug means, said lug means being movable between said slots upon reciprocal and rotary movement of said control tube and shift arm relative to said fixed axis, resilient means urging said lug means through said slots and resisting reciprocal movement of said control tube as said lug means is moved between said slots, and stop means limiting the axial spacing of said plate means and said shift arm against the action of said resilient means.

13. A shift control mechanism comprising, in combination, a support column, a control tube supported by said column for rotary and reciprocal movement relative to a fixed axis, a shift arm supported by said tube for rotary and reciprocal movement therewith and having projecting lug means, plate means supported by said column having slots spaced circumferentially relative to said fixed axis for receiving said lug means, said lug means projecting through said slots in certain rotative positions of said shift arm and bearing against said plate means in at least one rotative position of said shift arm, movement of said lug means between said slots being effected upon reciprocal and rotary movement of said control tube relative to said fixed axis, and stop means limiting the axial spacing of said plate means and said shift arm against the action of said resilient means when said lug means projects through said slots.

14. A control mechanism comprising, a support column, a control member supported by said column in annular spaced relationship thereto for rotary and reciprocal movement relative thereto, hand control means, housing means for supporting said hand control means, and means on said support column located interiorly thereof between said support column and said control member for supporting said housing means on said support column.

15. A control mechanism comprising, a support column, a control member supported by said column in annular spaced relationship thereto for rotary and reciprocal movement relative thereto, hand control means, housing means supporting said hand control means, and resilient means supported by said support column and located interiorly thereof between said support column and said control member for supporting said housing means on said support column.

16. A control mechanism comprising, a support column, a control member supported by said column in annular spaced relationship for rotary and reciprocal movement relative thereto, hand control means, housing means supporting said hand control means, and means including inwardly extending abutment means on said support column for supporting said housing means interiorly thereof.

17. A control mechanism comprising, a support column, a control member supported by said column in annular spaced relationship for rotary and reciprocal movement relative thereto, hand control means, housing means supporting said hand control means, inwardly extending abutment means on said support column located interiorly thereof between said support column and said control member, and resilient means supported on said abutment means for supporting said housing means on said support column.

18. A control mechanism comprising, a support column, a control member supported by said column for axial and rotary movement relative to a fixed axis, a controlled member, means mounting said controlled member on said column for rotary movement relative to said fixed axis, and means for laterally supporting said controlled member on said support column, said last-mentioned means including first resilient means engageable with said control member and said controlled member for biasing said control member in one axial direction and said controlled member in an opposite axial direction relative to said fixed axis, and second resilient means supported by said support column and engageable with said controlled member for biasing said controlled member in said one axial direction.

19. A control mechanism comprising, a support column, a control member supported by said column for axial and rotary movement relative to a fixed axis, a controlled member, means mounting said controlled member on said column for rotary movement relative to said fixed axis, and means for laterally supporting said controlled member on said support column, said last-mentioned means including first resilient means engageable with said control member and said controlled member for biasing said control member in one axial direction and said controlled member in an opposite axial direction relative to said fixed axis, second resilient means supported by said support column and engageable with said controlled member for biasing said controlled member in said one axial direction, and means limiting movement of said controlled member in said one axial direction.

References Cited in the file of this patent

UNITED STATES PATENTS

| | | |
|---|---|---|
| 2,631,467 | Lincoln et al. | Mar. 17, 1953 |
| 2,638,013 | Dodt | May 12, 1953 |
| 2,693,713 | Reid et al. | Nov. 9, 1954 |
| 2,696,126 | Lincoln et al. | Dec. 7, 1954 |